United States Patent [19]

Nakagawa

[11] Patent Number: 4,748,857
[45] Date of Patent: Jun. 7, 1988

[54] ULTRASONIC APPARATUS FOR MEASURING THE FLOW VELOCITY OF A FLUID

[75] Inventor: Yukio Nakagawa, Kanagawa, Japan
[73] Assignee: Fuji Electric Co., Ltd., Kanagawa, Japan
[21] Appl. No.: 17,046
[22] Filed: Feb. 20, 1987
[30] Foreign Application Priority Data Feb. 26, 1986 [JP] Japan .................................. 61-39056

[51] Int. Cl.⁴ ............................................. G01F 1/66
[52] U.S. Cl. .................................................. 73/861.28
[58] Field of Search ................. 73/861.27, 861.28, 597

[56] References Cited

U.S. PATENT DOCUMENTS 3,987,674 10/1976 Baumdel ........................... 73/861.28
4,015,470 4/1977 Morrison ........................... 73/861.03

FOREIGN PATENT DOCUMENTS 54-149670 3/1979 Japan .
59-14171 8/1984 Japan .
59-14172 11/1984 Japan .

Primary Examiner—Charles A. Ruehl
Attorney, Agent, or Firm—Finnegan, Henderson, Farabow, Garrett & Dunner

[57] ABSTRACT

An ultrasonic measuring apparatus is provided for measuring the flow velocity of a fluid in a pipe. The apparatus includes a pair of sensors which are mounted on a pipe, and which alternately transmit and receive ultrasonic waves. When the actual sound velocity of the ultrasonic wave in the fluid is not known, a value is assumed, a flow rate is measured, correct sensor mounting positions are calculated and the actual sound velocity of the ultrasonic wave is then determined. If the assumed sound velocity differs from the calculated sound velocity by more than a predetermined amount, the assumed sound velocity is adjusted and the procedure is repeated. Therefore, even when the sound velocity of an ultrasonic wave in a particular medium is not known, an actual sound velocity can be calculated. Accordingly, the ultrasonic measuring apparatus can accurately measure the flow velocity and flow rate of a fluid.

8 Claims, 2 Drawing Sheets

ULTRASONIC APPARATUS FOR MEASURING THE FLOW VELOCITY OF A FLUID

BACKGROUND

1. Field of the Invention

The present invention relates to an ultrasonic measuring apparatus for measuring the flow velocity or flow rate of a fluid.

2. Description of the Prior Art

A conventional ultrasonic measuring apparatus provides at least one pair of ultrasonic sensors which are capable of transmitting and receiving an ultrasonic wave through a fluid. The sensors operate alternately as a transmitting sensor and a receiving sensor. An ultrasonic wave is alternately transmitted by an upstream sensor and received by a downstream sensor (hereinafter referred to as "a forward direction") and transmitted by the downstream sensor and received by the upstream sensor (hereinafter referred to as "a reverse direction"). The "upstream" and "downstream" positions are determined with respect to the direction of flow of the fluid being measured. The ultrasonic propagation times are measured and according to the propagation times thus measured the flow rate or flow velocity of the fluid is determined (cf. Japanese Patent Application (OPI) No. 149670/1979, and Japanese Patent Application Publication Nos. 14171/1984 and 14172/1984 for instance).

FIG. 2 is a theoretical diagram of the measurement principle of an ultrasonic measuring apparatus. In FIG. 2 ultrasonic sensors 12a and 12b and wedge members 13a and 13b are placed on or near a pipe 11 through which a fluid 14 flows.

The propagation time of an ultrasonic wave which is transmitted in the forward direction is represented by $T_1$, and the propagation time of an ultrasonic wave transmitted in the reverse direction is represented by $T_2$. These propagation times include the periods $t_1$ and $t_2$ of propagation of the ultrasonic wave in the fluid. The period $\tau(\tau/2+\tau/2)$ of propagation in the wedge members 13a and 13b and the pipe 11 can be represented by expressions (1) and (2) as follows:

$$T_1 = t_1 + \tau \quad (1)$$

$$T_2 = t_2 + \tau \quad (2)$$

The propagation periods $t_1$ and $t_2$ in the fluid can be represented by expressions (3) and (4), respectively, as follows:

$$t_1 = \frac{D/\cos\theta}{C + V\sin\theta} \quad (3)$$

$$t_2 = \frac{D/\cos\theta}{C - V\sin\theta} \quad (4)$$

where C is the sound velocity in the fluid, V is the flow speed, D is the inside diameter of the pipe 11, and $\theta$ is the ultrasonic propagation angle.

From expressions (3) and (4), the time difference $\Delta T(=T_2-T_1)$ can be obtained as follows:

$$\begin{aligned}
\Delta T &= T_2 - T_1 \\
&= \frac{D/\cos\theta}{C - V\sin\theta} - \frac{D/\cos\theta}{C + V\sin\theta} \\
&= \frac{D/\cos\theta}{C^2 - V^2\sin^2\theta} \times \frac{2V\sin\theta}{1} \\
&= \frac{2D\sin\theta}{C^2\cos\theta} \text{ (where } C^2 \gg V^2\sin^2\theta\text{).}
\end{aligned} \quad (5)$$

That is, the time difference $\Delta T$ is proportional to the flow velocity V.

Expression (5) includes the sound velocity C in the fluid. The sound velocity C depends on the components or temperature of the fluid. Preferably, therefore, the flow coefficients will not include the sound velocity C. C can be eliminated as follows: If the ultrasonic propagation time in the fluid at rest is represented by $T_0$, then from expressions (1) and (2)

$$\begin{aligned}
T_0 &= T_1 = T_2 \\
&= \frac{D/\cos\theta}{C} + \tau
\end{aligned} \quad (6)$$

Expression (6) can be rewritten as follows:

$$C = \frac{D/\cos\theta}{T_0 - \tau} \quad (7)$$

Substitution of expression (7) into expression (5) gives $$T = \frac{\sin 2\theta}{D}(T_0 - \tau)^2 \cdot V \quad (8)$$

The flow rate Q can be represented by the following expression:

$$Q = (\text{sectional area}) \times (\text{average flow velocity}).$$

Therefore, from expression (5), the following expression (9) is obtained:

$$\begin{aligned}
Q &= \frac{1}{K} \cdot \frac{\pi D^2}{4} \cdot V \\
&= \frac{1}{K} \cdot \frac{\pi D^2}{4} \cdot \frac{D}{\sin 2\theta} \cdot \frac{\Delta T}{(T_0 - \tau)^2}
\end{aligned} \quad (9)$$

where K is a constant.

When the fluid is at rest, the ultrasonic propagation time is represented by $T_0$ as described above. However, when the fluid is flowing, the ultrasonic propagation time can be approximated by expression (10) as follows:

$$T_0 = (T_1 + T_2)/2 \quad (10)$$

This corresponds to the average propagation time.

An ultrasonic wave is refracted when it passes from one medium to another in which the sound velocity is different. Therefore, if the mounting angles of the ultrasonic sensors 12a and 12b are represented by $\theta_1$, the distance (mounting dimension) between the sensors by L, and angles $\theta$ and $\theta_2$, dimensions D, $D_1$ and $L_1$ and velocities $C_1$ and $C_2$ are as indicated in FIG. 2, then the following relation can be established:

$$\frac{C_1}{\sin\theta_1} = \frac{C_2}{\sin\theta_2} = \frac{C}{\sin\theta}.$$

$\theta$, $\theta_2$ and L can be represented by expressions (11), (12) and (13), respectively as follows:

$$\theta = \sin^{-1}(C/C_1 \sin \theta_1) \qquad (11)$$

$$\theta_2 = \sin^{-1}(C_2/C_1 \sin \theta_1) \qquad (12)$$

$$L = 2D_1 \tan \theta_2 + D \tan \theta \qquad (13)$$

Therefore, if the inside diameter D of the pipe, the ultrasonic propagation angle $\theta$ and the propagation period are given, then the flow rate can be obtained from expression (9) by measuring the ultrasonic propagation times $T_1$ and $T_2$. In this case, depending on the object to be measured, the pipe inside diameter D is determined, and the propagation time can be represented by the following expression with the data indicated in FIG. 2:

$$\tau/2 = \frac{D_1/\cos \theta_2}{C_2} + \frac{L_1/\cos \theta_1}{\theta_1}$$

Therefore, the propagation time $\tau$ can be obtained as a constant if the materials of the pipe and the material of the wedges are determined. As is apparent from expression (11), $\theta$ is a function of the sound velocity C, and should have a certain value.

The ultrasonic measuring apparatus based on the above-described principle can measure the flow velocity and flow rate of a fluid in a pipe on which the sensors are mounted. Therefore, if a portable ultrasonic measuring apparatus is provided according to the above principles, it can be used to measure flow rates of fluid in pipes.

As described above, an ultrasonic wave signal is applied to the pipe from outside, propagates in the pipe, and is received by the other sensor. In this operation, as is well known in the art, the ultrasonic wave is refracted when passing from one medium to another in which the sound velocity is different, and the angle between the direction of flow and the direction of propagation of the ultrasonic wave, i.e., the ultrasonic propagation angle $\theta_1$ affects the accuracy of measurement of a flow velocity or flow rate. The angle $\theta$ further affects the distance L represented by expression (13). Accordingly, in order to improve the accuracy and to accurately detect the received wave, it is essential that the sound velocity C be accurately determined.

As described above, the velocity of an ultrasonic wave in a fluid is dependent upon the type of fluid, the component mixture ratio, the temperature and the pressure of the fluid. Therefore, it is difficult to determine the wave velocity in advance. Thus, the measurement accuracy is reduced, or the types of fluid which can be accurately measured are limited.

OBJECTS AND SUMMARY OF THE INVENTION

It is an object of this invention to provide an ultrasonic measuring method and apparatus which can accurately determine the flow velocity and flow rate of a fluid free from the limitations of prior art devices.

This and other objects of the present invention are accomplished utilizing an ultrasonic measuring apparatus having a pair of ultrasonic sensors which alternately function to transmit and receive an ultrasonic wave. A propagation time measuring section receives signals indicative of transmission and receipt of the ultrasonic wave and measures the times therebetween. A main calculating section is provided for receiving propagation times measured by the propagation time measuring section and calculating an average propagation time therefrom. A setting section is provided for inputing specification data including a pipe dimension and an assumed sound velocity. A flow rate calculating section calculates a flow rate of the fluid using the assumed sound velocity and the propagation times. An optimum mounting dimension for the ultrasonic sensors is calculated by a mounting dimension calculating section using the specification data and the assumed sound velocity as parameters. An actual ultrasonic sound velocity is then calculated by a sound velocity calculaing section using the measured propagation times and the calculated mounting dimension. The assumed sound velocity is then compared with the calculated sound velocity and when the comparison is greater then a predetermined value the assumed sound velocity is adjusted and the process is repeated.

The accompanying drawings which are incorporated in and constitute a part of this specification illustrate various embodiments of the invention and, together with the description, serve to explain the principles of the invention.

BRIEF DESCRIPTION OF THE DRAWINGS

The manner by which the above object and other objects, features and advantages of the present invention are attained will become fully apparent from the description of the invention which follows, taken in conjunction with the accompanying drawings, wherein like reference numerals denote like elements, and wherein.

DESCRIPTION OF THE PREFERRED EMBODIMENTS

The present invention will be described in detail with reference to the accompanying drawings which illustrate preferred embodiments of the present invention.

In the apparatus according to this invention, a value for the sound velocity is assumed, data necessary for flow velocity measurement or flow rate measurement is calculated to obtain the actual sound velocity, and when the sound velocity thus calculated is different by a predetermined value or more from the assumed sound velocity value, a correct mounting position is specified for the ultrasonic sensors.

Figure 1:
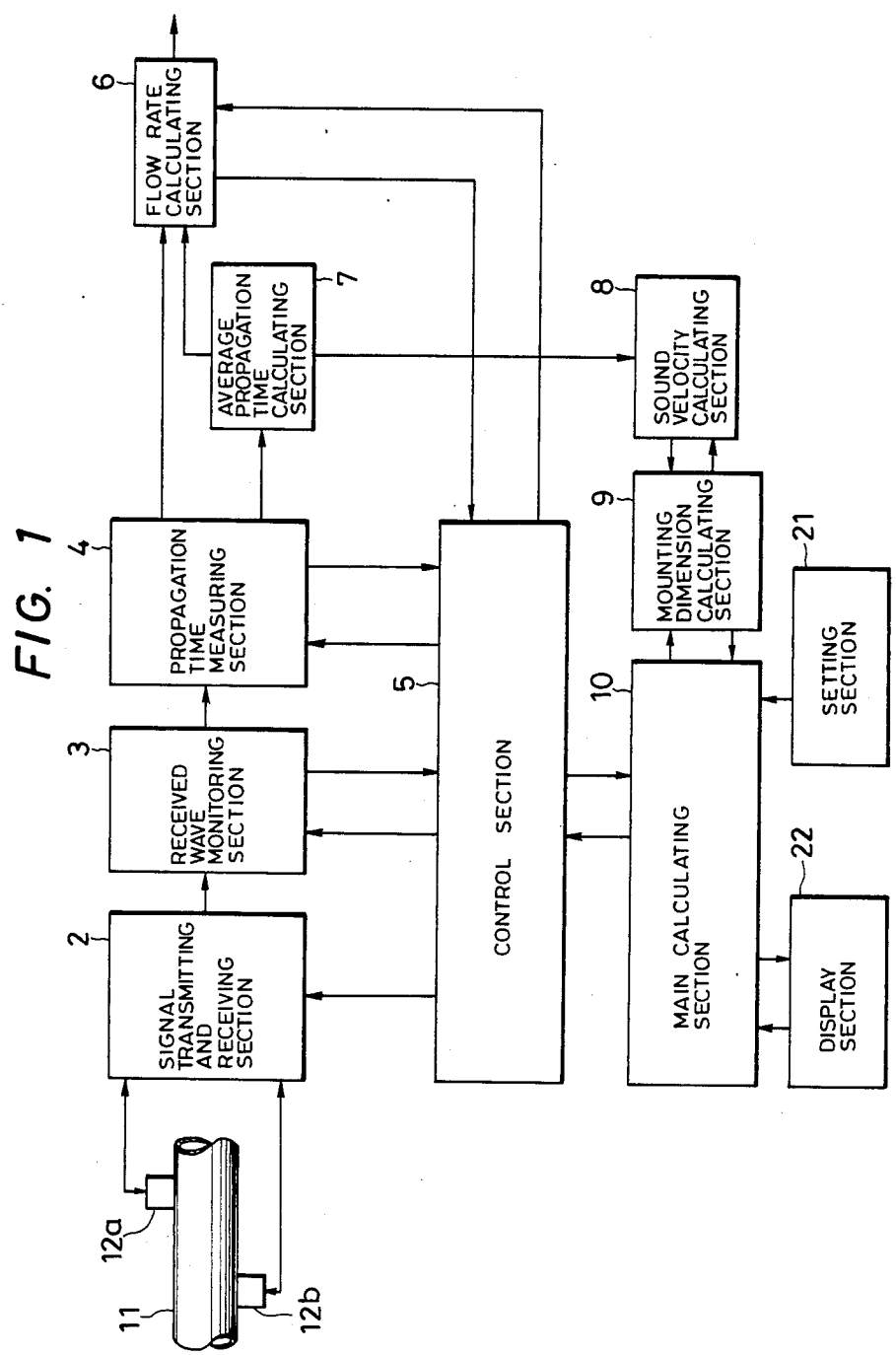
FIG. 1 is a block diagram showing one example of an ultrasonic measuring apparatus according to the present invention.
Figure 2:
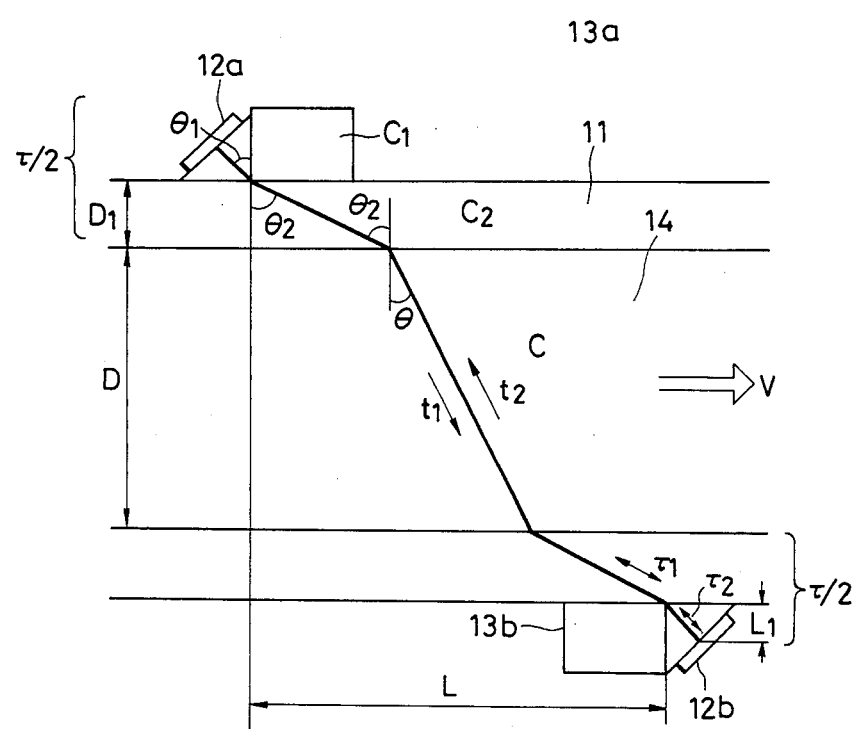
FIG. 2 is a theoretical diagram describing the measurement principle of the ultrasonic measuring apparatus of the present invention.

FIG. 1 is a block diagram showing the arrangement of one embodiment of the apparatus and method of this invention. At least one pair of ultrasonic sensors 12a and 12b, which are, for example, constructed of PZT (lead zirco-titanate), is placed on the outer surface of the pipe 11 through which the fluid to be measured flows. Each of the ultrasonic sensors 12a and 12b is a conversion element for converting an electrical signal into an acoustic signal or vice versa. In one mode, the sensor 12a serves as a conversion element on the signal transmitting side, while the sensor 12b serves as a conversion element on the signal receiving side. In another mode, the sensor 12a serves as a conversion element on the signal receiving side, while the sensor 12b serves as a conversion element on the signal transmitting side.

The signal transmitting and receiving section 2 functions to transmit and receive an ultrasonic wave, and communicates a signal indicative of a wave which has been received to a wave monitoring section 3. The wave monitoring section 3 sets and changes amplifier gain and set values for signal reception, and adjusts the transmitted and received wave balance so that receipt of the ultrasonic wave is under optimum conditions.

The propagation time measuring section 4 measures the propagation times $T_1$ and $T_2$ in the forward and reverse directions from the time of transmission of an ultrasonic wave until the time of reception of the ultrasonic wave. The average propagation time calculating section 7, calculates the average propagation time $T_0$, preferably using expression (10). The flow rate calculating section 6 calculates the flow rate preferably using expression (9), according to the ultrasonic propagation times $T_1$ and $T_2$ provided by the propagation time measuring section 4 and the average propagation time $T_0$ outputted by the average propagation time calculating section 7.

The sound velocity calculating section 8 calculates the actual sound velocity C, preferably using expression (7). The mounting dimension calculating section 9 calculates the distance L between the sensors (the mounting dimension), which is preferably represented by expression (13). The setting section 21 inputs measuring conditions including pipe specification data and an assumed sound velocity. The display section 22 displays mounting dimensions or measurement values. The main calculating section 10 calculates data, other than the data calculated by the various sections 6 through 9, but which is required for flow measurement. For example, $\theta$ of expression (11), $\theta_2$ of expression (12) and the propagation time $\tau$ are calculated by the main calculating section. The control section 5 controls the signal transmitting and receiving section 2, the wave monitoring section 3, the propagation time measuring section 4, the flow rate calculating section 6, and the main calculating section 10.

The ultrasonic measuring apparatus described above functions as follows:

(a) A suitable sound velocity Cc is assumed and inputted using setting section 21 (The sound velocity in a fluid is of the order of 1000 to 2000 m/s. Thus a number in this general range is originally selected.).

(b) Expressions (7) and (13) are calculated using the sound velocity Cc thus inputted, and the sensor mounting dimension L is displayed. In addition, the data necessary for time measurement is set.

(c) When the sensors are mounted with the mounting dimension thus displayed, even if the assumed value of the sound velocity is different from the measured (actual) value thereof, the receiving sensor may still be able to receive the ultrasonic wave because the ultrasonic beam spreads in a certain range. Therefore, when the ultrasonic wave transmitted is received, the average propagation time $T_0$ is obtained as follows:

$$T_0 = \frac{T_1 + T_2}{2}$$

If the receiving sensor does not receive the ultrasonic wave, an indication thereof is displayed, the set value of the sound velocity is changed and the operation described in paragraph (a) is effected again.

(d) A predetermined value $\tau$ is subtracted from the average propagation time $T_0$, and the sound velocity C is obtained from the following equation:

$$T_0 - \tau = \frac{D/\cos\theta}{C} \text{ or } C = \frac{D/\cos\theta}{T_0 - \tau}$$

(e) When the sound velocity C obtained deviates from the set sound velocity Cc by a predetermined value or more, or when necessary, the sensor mounting dimension and the data necessary for measurement are calculated and displayed using the actual sound velocity C obtained, and the time measuring section is reset. In this operation, the amount of adjustment to the assumed sound velocity is represented, for example, by C/Cc. C/Cc is compared with the predetermined value $\alpha$ to evaluate the amount of shift.

(f) The sensor mounting positions are changed according to the mounting dimension displayed so that the flow measurement is very accurate.

In the method described above, when the calculated sound velocity C is different from the preset sound velocity Cc by the predetermined value or more, the mounting positions of the sensors are changed. Alternatively, the following method may be used. In the above-described method, $\theta_1$ is constant. In the following method, a value for $\theta_1$ is assumed which will give the preset value of L. Then, $\theta_1$ is measured using expression (12) and $\theta_1$ is inputted as the assumed value, to correct the flow velocity and the flow rate. This alternate method is preferably employed when the value C/Cc is smaller than the predetermined value $\alpha$. When C/Cc is larger than the predetermined value the sensor mounting dimension should be adjusted to receive the ultrasonic wave under optimum conditions. In this case, the strength of the ultrasonic wave received by the signal transmitting and receiving section in FIG. 1 may be employed as decision index. For example, when the value C/Cc is smaller than the predetermined value $\alpha$ and a low strength ultrasonic wave is received, the method in which correction is carried out with the data $\theta_1$ as a variable may be used. When, on the other hand, the value C/Cc is larger than the predetermined value $\alpha$ or a low strength ultrasonic wave is received, the method in which the mounting dimension is changed may be employed. In this regard, it can be determined from the gain (controlled by the received wave monitoring section 3) of the amplifier in the signal transmitting and receiving section 2 whether the strength of the ultrasonic wave received is high or low.

While the preferred embodiments of the invention have been described, it is to be understood that the invention is not limited thereto, but may be otherwise embodied within the scope of the following claims.

What is claimed is:

1. A device for measuring the flow velocity of a fluid in a pipe comprising:
    a pair of ultrasonic sensors spaced apart along the pipe, each of said sensors alternately functioning as a conversion element for converting an electrical signal into an acoustic signal or an acoustic signal into an electrical signal;
    a signal transmitting section which functions to transmit an ultrasonic wave;

a signal receiving section which functions to receive an ultrasonic wave;

a propagation time measuring section which receives signals indicative of transmission and receipt of an ultrasonic wave, said propagation time measuring section measuring the time between the transmitting of said ultrasonic wave and the reception of said ultrasonic wave in a upstream direction and in a downstream direction;

a main calculating section for receiving propagation times measured by said propagation time measuring section and calculating an average propagation time therefrom;

a setting section for inputting specification data including a pipe dimension and an assumed sound velocity;

a flow rate calculating section for calculating a flow rate of said fluid using said assumed sound velocity and said propagation times:

a mounting dimension calculating section for calculating an optimum mounting dimension using said specification data and said assumed sound velocity; and a sound velocity calculating section for calculating the actual ultrasonic sound velocity using said propagation times and said mounting dimension.

2. The apparatus according to claim 1, further comprising a comparison section for comparing said assumed sound velocity with said calculated sound velocity, whereby when said comparison is greater than a predetermined value, said assumed sound velocity is adjusted and said flow velocity measurement is repeated.

3. The apparatus according to claim 2, wherein said flow rate calculating section calculates said flow rate using a difference between said propagation time in said upstream and downstream directions and using said average propagation time.

4. The apparatus according to claim 3, further comprising a display section which displays said optimum mounting dimension.

5. The apparatus according to claim 2, wherein an amount of adjustment of said assumed sound velocity is determined by dividing the calculated sound velocity by the assumed sound velocity.

6. A method of measuring the flow of a fluid in a pipe using an ultrasonic wave comprising:
 (a) assuming an original sound velocity for the ultrasonic wave;
 (b) transmitting and receiving the ultrasonic wave through the fluid in the pipe in the direction of flow of the fluid and in a direction opposite the flow of the fluid;
 (c) measuring the propagation time of the ultrasonic wave in the fluid, when the sound wave is transmitted at least in a direction of flow of the fluid and then in a reverse direction of flow of the fluid;
 (d) calculating an average propagation time of the ultrasonic wave;
 (e) determining a measured velocity for the ultrasonic wave in the fluid;
 (f) setting a new assumed sound velocity when the difference between the original assumed sound velocity and the measured sound velocity is greater than a predetermined value; and
 (g) repeating steps (a) through (f) until the difference between the assumed sound velocity and the measured sound velocity is less than said predetermined value.

7. The method according to claim 6, wherein said step of transmitting and receiving comprises the steps of alternately performing said transmitting and receiving of said ultrasonic wave by means of a pair of ultrasonic sensors being mounted in a spaced apart manner along said pipe.

8. The method according to claim 7, further comprising the step of adjusting positions of mounting of said pair of sensors when said measured sound velocity deviates from said assumed sound velocity by more than said predetermined value.

* * * * *